US010897462B2

(12) United States Patent
Ogle

(10) Patent No.: US 10,897,462 B2
(45) Date of Patent: Jan. 19, 2021

(54) SYSTEMS AND METHODS FOR ENCODING ADDITIONAL AUTHENTICATION DATA INTO AN ACTIVE DIRECTORY SECURITY IDENTIFIER

(71) Applicant: Citrix Systems, Inc., Fort Lauderdale, FL (US)

(72) Inventor: Andrew Ogle, Buckinghamshire (GB)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 282 days.

(21) Appl. No.: 15/596,228

(22) Filed: May 16, 2017

(65) Prior Publication Data

US 2018/0337905 A1 Nov. 22, 2018

(51) Int. Cl.
*G06F 7/04* (2006.01)
*G06F 15/16* (2006.01)
*H04L 29/06* (2006.01)

(52) U.S. Cl.
CPC .............. *H04L 63/08* (2013.01); *H04L 63/20* (2013.01)

(58) Field of Classification Search
CPC ................................ H04L 63/08; H04L 63/20
See application file for complete search history.

(56) References Cited

U.S. PATENT DOCUMENTS

| | | | | |
|---|---|---|---|---|
| 5,450,590 A * | 9/1995 | Elko | ....................... | G06F 15/17 714/E11.009 |
| 5,768,519 A * | 6/1998 | Swift | .................... | H04L 63/101 709/223 |
| 6,279,111 B1 * | 8/2001 | Jensenworth | ......... | G06F 21/335 713/159 |
| 6,711,686 B1 * | 3/2004 | Barrett | ..................... | G06F 21/50 709/221 |
| 7,246,221 B1 * | 7/2007 | Soltis | ..................... | G06F 9/4416 709/219 |
| 7,248,691 B1 * | 7/2007 | Pandit | ................... | H04L 9/0643 380/273 |
| 7,401,235 B2 * | 7/2008 | Mowers | .................. | G06F 21/31 726/2 |
| 7,580,933 B2 * | 8/2009 | Johnson | ................ | G06F 21/604 |
| 7,668,881 B1 * | 2/2010 | Hoffmann | ............... | G06F 16/10 707/756 |
| 8,214,641 B2 * | 7/2012 | Field | .................... | G06F 21/6236 713/165 |
| 2002/0019941 A1 * | 2/2002 | Chan | ...................... | G06F 21/53 713/185 |
| 2005/0044399 A1 * | 2/2005 | Dorey | ................. | G06F 21/6236 726/26 |

(Continued)

*Primary Examiner* — Jeffrey Nickerson
*Assistant Examiner* — Vadim Savenkov
(74) *Attorney, Agent, or Firm* — Fox Rothschild LLP; Robert J. Sacco; Carol E. Thorstad-Forsyth

(57) ABSTRACT

Systems and methods for operating a computing system. The methods comprise: obtaining, by a first computing device, an original Security Identifier ("SID"); transforming, by the first computing device, the original SID into a composite SID by modifying the original SID to include at least (a) an SID format value indicating a structural format of an SID and (b) a pointer specifying a memory location at which non-SID authentication information is stored or a customer number indicating an entity to which a user is associated; and using the composite SID by the first computing device during SID based operation.

20 Claims, 6 Drawing Sheets

(56) References Cited

U.S. PATENT DOCUMENTS

| | | | | |
|---|---|---|---|---|
| 2005/0091265 | A1* | 4/2005 | Rimer | G06F 9/4493 |
| 2006/0015741 | A1* | 1/2006 | Carroll | H04L 63/101 |
| | | | | 713/182 |
| 2006/0123472 | A1* | 6/2006 | Schmidt | G06F 21/41 |
| | | | | 726/8 |
| 2008/0235790 | A1* | 9/2008 | Malhotra | G06F 21/604 |
| | | | | 726/20 |
| 2009/0049047 | A1* | 2/2009 | Battepati | G06F 21/6218 |
| 2009/0328180 | A1* | 12/2009 | Coles | G06F 9/468 |
| | | | | 726/9 |
| 2010/0318997 | A1* | 12/2010 | Li | G06F 9/45558 |
| | | | | 718/104 |
| 2018/0288057 | A1* | 10/2018 | Varadamma | H04L 63/101 |
| 2019/0087113 | A1* | 3/2019 | Isozaki | G06F 3/0637 |

* cited by examiner

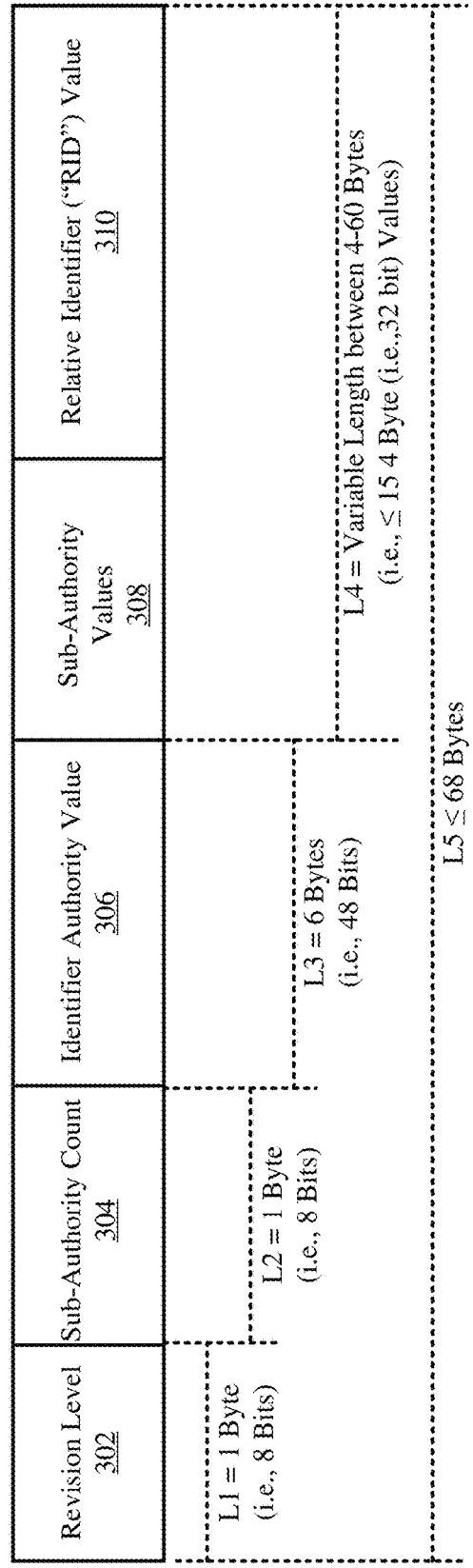

FIG. 5

Composite SID Structure 500

| Revision Level 502 | Sub-Authority Count 504 (modified to include e.g., a count for each 4 Bytes used for cust. no./pointer) | Composite Field Value 506 | | Sub-Authority Values 514 | |
|---|---|---|---|---|---|
| | | Identifier Authority Value 510 [ 520 ] | SID Format Value 512 | Existing Values Cust. No. or Pointer 518 (e.g., 4, 8, 12 or 16 Bytes) | Relative Identifier ("RID") Value 516 |
| L1 = 1 Byte (i.e., 8 Bits) | L2 = 1 Byte (i.e., 8 Bits) | L6 = 5 Bytes L3 = 6 Bytes (i.e., 48 Bits) | L7 = 1 Byte | L4 = Variable Length between 4-60 Bytes (i.e., ≤ 15 4 Byte (i.e., 32 bit) RID Values) | |

L5 ≤ 68 Bytes

FIG. 6

Composite Field Values 600

| | Non-zero SID Format Value 602 |
|---|---|
| Composite NULL_SID_AUTHORITY | 0x01, 0x00, 0x00, 0x00, 0x00, 0x00 |
| Composite WORLD_SID_AUTHORITY | 0x01, 0x00, 0x00, 0x00, 0x00, 0x01 |
| Composite LOCAL_SID_AUTHORITY | 0x02, 0x00, 0x00, 0x00, 0x00, 0x02 |
| Composite CREATOR_SID_AUTHORITY | 0x02, 0x00, 0x00, 0x00, 0x00, 0x03 |
| Composite NON_UNIQUE_AUTHORITY | 0x03, 0x00, 0x00, 0x00, 0x00, 0x04 |
| Composite NT_AUTHORITY | 0x03, 0x00, 0x00, 0x00, 0x00, 0x05 |
| Composite SECURITY_MANDATORY_LABEL_AUTHORITY | 0x04, 0x00, 0x00, 0x00, 0x00, 0x06 |

SYSTEMS AND METHODS FOR ENCODING ADDITIONAL AUTHENTICATION DATA INTO AN ACTIVE DIRECTORY SECURITY IDENTIFIER

BACKGROUND

Statement of the Technical Field

The present disclosure relates generally to computing systems. More particularly, the present disclosure relates to implementing systems and methods for encoding additional authentication data into an Active Directory ("AD") Security Identifier ("SID").

Description of the Related Art

SIDs are used to uniquely identify trustees. The trustees can include user accounts, computer accounts, user groups and/or threads or processing running on computing devices in a Windows® Operating System ("OS"). SIDs are typically issued by a Windows domain controller at the time an account or group is created, and thereafter stored in a security database. An SID value includes the following components: a revision level of the SID structure; a 48-bit identifier authority value that identifies the authority that issued the SID; a variable number of sub-authority values that uniquely identify the trustee relative to the authority that issued the SID; and a Relative Identifier ("RID") value. For example, an SID has the notation S-2-7-43-102 (i.e., a revision level of 2, an identifier authority value of 7, a first sub-authority value of 43, and an RID 102).

Each time a user signs into the system, an access token containing the respective SID(s) is created for the user. The access token provides a means to authentic user credentials against authentication data stored in an authentication database for purposes of making security decisions (e.g., allowing or denying user access to a particular resource).

SUMMARY

The present solution concerns implementing systems and methods for operating a computing system. The methods comprise obtaining an original SID by a first computing device (e.g., an SID based server). In some scenarios, the original SID is received by the first computing device from a second remote computing device (e.g., a client communications device). In other scenarios, the original SID is obtained by the first computing device in response to a reception of a non-SID token (e.g., a Security Assertion Markup Language ("SAML") token). After the first computing device obtains the original SID, it performs operations to transform or convert the original SID into a composite SID. This transformation or conversion is achieved by modifying the original SID to include at least (a) an SID format value and (b) a pointer or a customer number. The SID format value indicates a structural format of an SID. The SID format value may be selected to have a non-zero value when an indication is to be made that an SID has a composite SID format, and a zero value when an indication is to be made that an SID has a non-composite SID format. The pointer specifies a memory location at which non-SID authentication information (e.g., an SAML token) is stored. The customer number indicates an entity to which a user is associated. The composite SID is used by the first computing device during SID based operation.

In those or other scenarios, the SID format value is included in an SID identifier authority value. The SID identifier authority value including the SID format value has a first length equal to a second length of an SID identifier authority value of the original SID that is absent of the SID format value. The pointer or customer number is entirely contained in SID sub-authority values. Alternatively, the pointer or customer number is at least partially contained in SID sub-authority values and at least partially contained in an SID identifier authority value. In both cases, the transformation further comprises modifying a sub-authority count to include at least one count for the pointer or customer number contained in the SID sub-authority values.

BRIEF DESCRIPTION OF THE DRAWINGS

The present solution will be described with reference to the following drawing figures, in which like numerals represent like items throughout the figures.

FIG. 3 is an illustration of an illustrative structure for a conventional SID.

FIG. 4 is an illustration that is useful for understanding defined identifier authority values for the SID of FIG. 3.

FIG. 5 is an illustration of an illustrative structure for a composite SID.

FIG. 6 is an illustration that is useful for understanding defined identifier authority values for the SID of FIG. 5.

DETAILED DESCRIPTION

Figure 1:
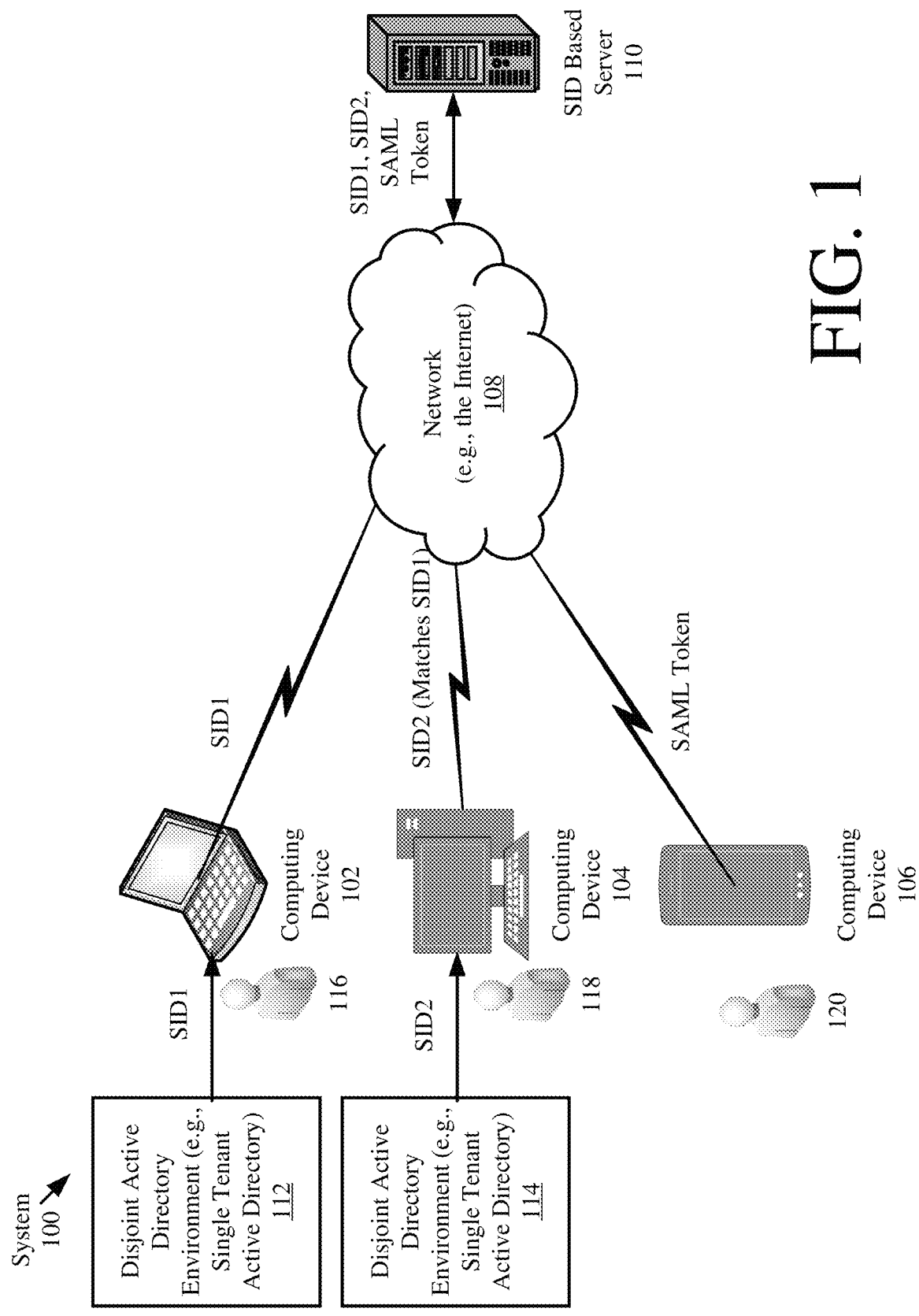
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Conventional large and complex computing systems running in Microsoft Windows environments were designed and built around the assumption that an SID is a unique identity for a trustee. However, there is a need to extend such computing systems to support additional environments where: there are multiple disjoint AD domains in which the uniqueness of SIDs cannot be assumed; and/or alternative authentication schemes (e.g., a Security Assertion Markup Language ("SAML") authentication scheme or a mixture of both SID and SAML-based authentication scheme) are employed. In this regard, the present solution provides a mechanism for such computing systems to continue using SIDs internally as unique identifiers in these additional environments without the need to make extensive and/or costly changes to modify every SID reference within the computing system to become a complex token incorporating a customer ID, SID and/or SAML token.

The term "customer", as used herein, refers to an entity that might require support for disjoint AD environments. However, the present solution may be applied to any system where disjoint environments need to be supported retrospectively.

Referring now to FIG. 1, there is provided an illustration of an illustrative system 100. System 100 is generally configured to encode additional authentication data into Security Identifiers ("SIDs"). In this regard, system 100 comprises a plurality of client computing devices 102, 104, 106 being respectively used by individuals 116, 118, 120 to access web services hosted by server 110. The client computing devices include, but are not limited to, desktop computers, laptop computers, personal computers, personal digital assistants, smart phones, and/or mobile phones. Each of the listed computing devices is well known in the art, and therefore will not be described herein.

The individuals 116, 118, 120 are employees of different companies. For example, individual 116 is an employee at company A and individual 118 is an employee at company B. Each company A and B has its own disjoint active directory environment (e.g., single tenant directory) 112, 114 for providing identifying information for its employees. The disjoint active directory environment 112 is installed at company A's local datacenter, and the disjoint active directory environment 114 is installed at company B's datacenter. Disjoint active directory environments and single tenant directories are well known in the art, and therefore will not be described herein. In some scenarios, the disjoint active directory environments 112, 114 include, but are not limited to, Microsoft® ADs.

The identifying information includes SIDS, such as SID1 and SID2. The SIDs ensure that only those authorized individuals 116, 118 gain access to resources (e.g., licensed software applications, folders, files and/or documents) of company A or B. Each SID in a disjoint active directory environment (e.g., single tenant directory) uniquely identifies a particular employee of a respective company A or B. Accordingly, SID1 uniquely identifies individual 116 from other employees in company A. Similarly, SID2 uniquely identifies individual 118 from other employees in company B. However, SID1 and SID 2 match each other, and therefore do not uniquely identify individuals 116 and 118 on a global basis or across companies. This causes issues when both individuals 116, 118 are using a relying party product (e.g., a web service) hosted by SID based server 110 since the relying party product assumes that both SIDs are unique.

Therefore, the SID based server 110 is configured to modify the SIDs upon receipt thereof so as to generate composite SIDs. The composite SIDs are generally generated by adding customer identifiers thereto. Each customer identifier respectively identifies computing device 102, computing device 106, company A, company B or some other thing that indicates that the composite SID is associated with a particular individual 116, 118. The composite SIDs are then used by the code executed on the SID based server 110 for performing various intended functions. When the SID based server 110 needs to communicate with an external device (such as computing device 102 or 104), it transforms the composite SID back into the original SID1 or SID2. The original SID1 or SID2 is then included in data packets sent from server 110 to the external device via network 108 (e.g., the Internet).

As shown in FIG. 1, system 100 may also comprise a computing device 106 that uses non-SID tokens (e.g., an SAML token) for authentication and authorization purposes. The non-SID token can include, but is not limited to, an SAML token. SAML tokens are well known in the art, and therefore are not described herein. Since server 110 is an SID based server, relying party products hosted thereby are not operative to use the SAML token for any purpose. As such, server 110 is configured to generate a composite SID upon receipt of the SAML token. This composite SID is then used by the code executing on the SID based server 110 for performing various functions (e.g., user authentication functions, recourse access authorization functions, etc.). When the SID based server 110 needs to communicate with an external device (such as computing device 106), it transforms the composite SID back into the original SAML token. The original SAML token is then included in data packets sent from server 110 to the external device via network 108 (e.g., the Internet).

Figure 2:
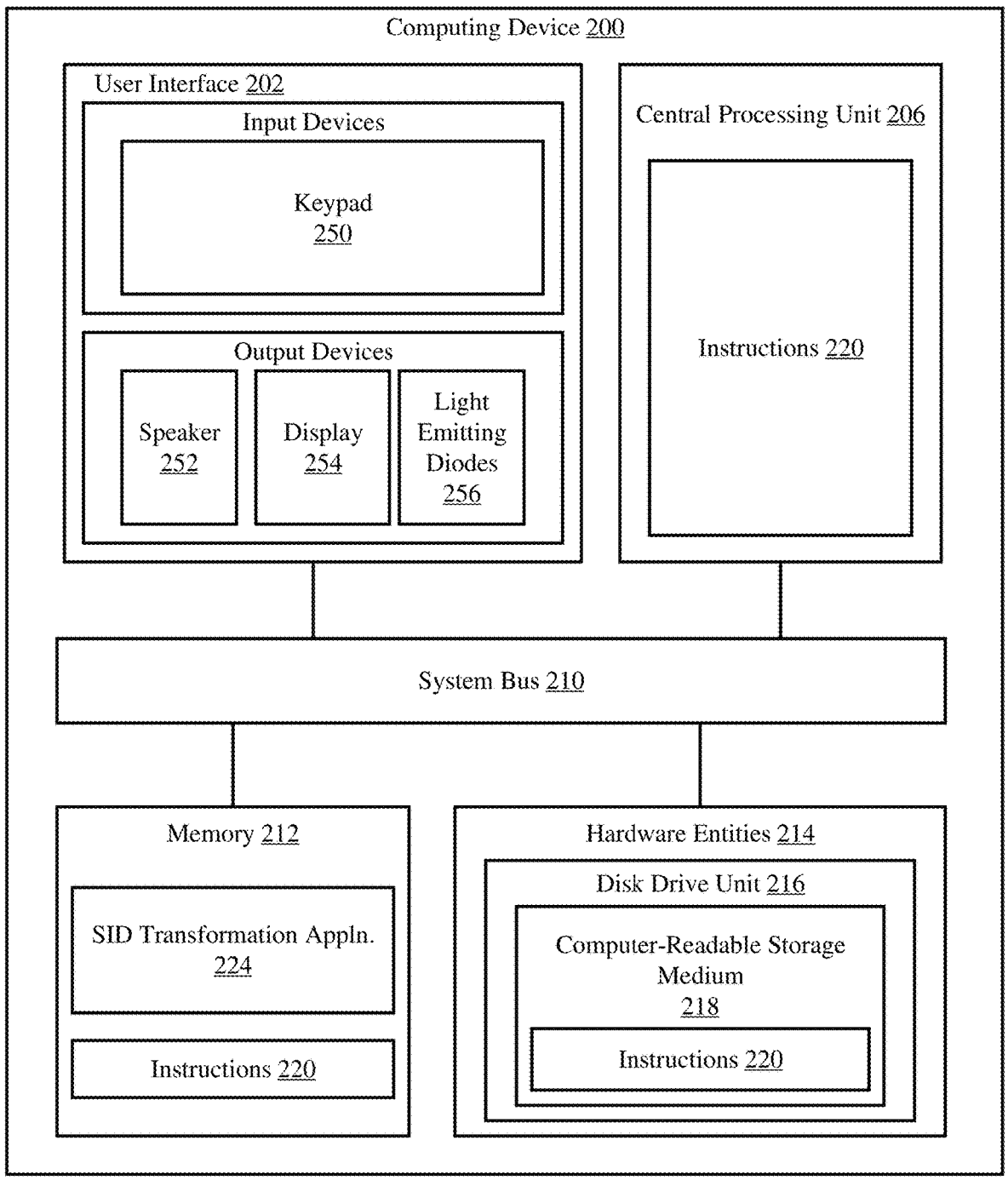
FIG. 2 is an illustration of an illustrative computing device.

Referring now to FIG. 2, there is provided a detailed block diagram of an illustrative architecture for a computing device 200. Server 118 of FIG. 1 is the same as or substantially similar to computing device 200. As such, the following discussion of computing device 200 is sufficient for understanding server 118 of FIG. 1.

Computing device 200 may include more or less components than those shown in FIG. 2. However, the components shown are sufficient to disclose an illustrative embodiment implementing the present solution. The hardware architecture of FIG. 2 represents one embodiment of a representative computing device configured to facilitate the generation of composite SIDs. As such, the computing device 200 of FIG. 2 implements at least a portion of a method for (a) constructing a composite SID including original SID information and additional authentication information and (b) extracting the additional authentication information from the composite SID in accordance with the present solution.

Some or all the components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 200 through system bus 210, and hardware entities 214 connected to system bus 210. The user interface can include input devices (e.g., a keypad 250) and output devices (e.g., speaker 252, a display 254, and/or light emitting diodes 256), which facilitate user-software interactions for controlling operations of the computing device 200.

At least some of the hardware entities 214 perform actions involving access to and use of memory 212, which can be a RAM, a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 222 for execution by the computing device 200 and that cause the computing device 200 to perform any one or more of the methodologies of the present disclosure.

In some scenarios, the hardware entities 214 include an electronic circuit (e.g., a processor) programmed for facilitating (a) the construction of a composite SID including original SID information and additional authentication information and (b) the extraction of the additional authentication information from the composite SID. In this regard, it should be understood that the electronic circuit can access and run an SID transformation application 224 installed on the computing device 200. The software application 224 is generally operative to: receive issued SIDs (e.g., SID1 and SID2 of FIG. 1) and/or non-SID token (e.g., SAML token of FIG. 1) from external devices (e.g., computing devices 102 and 104 of FIG. 1); transform the received SIDs into composite SIDs and the non-SID tokens into composite SIDs; cause the composite SIDs to be used by code being executed by computing device 200; transform the composite SIDs back into the original issued SIDs or SAML token; and cause the original issued SIDs and SAML tokens to be used for communications with external devices. Other functions of the software application 224 will become apparent as the discussion progresses.

The structure of SIDs and composite SIDs are now described for purposes of assisting a reader in understanding the present solution. An illustration of an illustrative structure for a conventional SID is provided in FIG. 3. An illustration of an illustrative structure for a composite SID is provided in FIG. 5.

Referring now to FIG. 3, the conventional SID structure 300 comprises an array of bytes having a total length L5 less than or equal to sixty-eight (68) bytes. The byte array is defined by a revision level 302, a sub-authority count 304, an identifier authority value 306, sub-authority values 308 and RID values 310. The revision level 302 comprises an unsigned integer that specifies the revision level of the SID structure. The length of the revision level L1 is 1 byte (i.e., 8 bits). The sub-authority count 304 comprises an unsigned integer that specifies the number of elements in a sub-authority array. The length of the sub-authority count L2 is one (1) byte (i.e., 8 bits). The identifier authority value 306 identifies the authority that issued the SID. The length of the identifier authority value L3 is six (6) bytes (i.e., 48 bits). The sub-authority values 308 identify sub-authorities of an AD account. The RID value 310 comprises an integer representing the relative ID of the AD account which is unique in its domain. The length of segment L4 is variable between four (4) bytes and sixty (60) bytes. Each value comprises four (4) bytes of information. A maximum of fifteen (15) values can be contained in segments 308, 310 of the SID (where one value is always an RID).

Notably, a typical AD SID has a length of twenty-eight (28) bytes. The typical AD SID consists of the following four (4) sub-authority values 308 and a RID value 310: first sub-authority value of twenty-one (21); second, third and fourth sub-authority values representing the SID-base of the domain; and a fifth value representing the RID of the account which is unique in its domain.

A plurality of defined identifier authority values 400 are shown in the table of FIG. 4. As evident from FIG. 4, each identifier authority value comprises six (6) bytes. The first five bytes have a zero (0) value. The last byte has a non-zero value.

The conventional SID structure 300 allows additional data to be merged therewith such that: the resulting byte array is still structurally a valid SID and can continue to use SID-specific datatypes; and the original SID and additional data can be recovered later without loss of information. Accordingly, the present solution uses the six (6) byte identifier authority value segment of an SID structure to encode a format byte identifying a standard conventional SID format or a composite SID format. This is possible because although the identifier authority value 306 is a fixed six (6) byte field and existing identity authorities consume only a single byte with all other bytes being zero (0) (as shown in FIG. 4).

Referring now to FIG. 5, an illustrative structure 500 for a composite SID is shown. The composite SID structure 500 contains a revision level 502, a sub-authority count 504, a composite field value 506, sub-authority values 514, and an RID value 516. Components 502, 516 are the same as or substantially similar to components 302, 310 of FIG. 3, respectively. As such, the discussion provided above with regard to components 302, 310 is sufficient for understanding components 502, 516 of FIG. 5.

The composite field values 506 include an identifier authority value 510 and an SID format value 512. The length of the identifier authority value L6 is five (5) bytes, while the length of the format value L7 is one (1) byte. The identifier authority value 510 identifies the authority that issued the SID. The SID format value 512 indicates whether the SID is a conventional SID or a composite SID. A zero SID format value indicates that the SID is a conventional SID. A non-zero SID format value indicates that the SID is a composite SID. Illustrative composite field values 600 with non-zero SID format values 602 are shown in FIG. 6. The present solution is not limited to the particulars of FIG. 6. For example, the non-zero SID format values 602 can be contained in any one of the composite field value bytes selected in accordance with a particular application. Additionally or alternatively, the SID format values 602 can be any integer number selected in accordance with a particular application (e.g., an SID format value falls between 1-255). For example, if the authority value "0,0,0,0,0,5", then composite authority value is "1,5,A,B,C,D", where the first value is the format value, the second value is the original non-zero value from the authority, and A-D are arbitrary data from the customer ID/pointer. The present solution is not limited to the particular of this example.

In some scenarios, there are four (4) possible non-zero values for the SID format value 512. The following TABLE 1 shows these four (4) possible values as well as what each indicates.

TABLE 1

| SID Format Value | Meaning |
| --- | --- |
| 1 | An entire customer number 518 is contained in the sub-authority values 514 |
| 2 | A first part 520 of a customer number 518 is contained in the identity authority value 510 and/or a second part 518 of the customer number is contained in the sub-authority values 514 |
| 3 | An entire pointer 518 is contained in the sub-authority value 514 |
| 4 | At least a first part 520 of a pointer is contained in the identifier authority values 510 and/or a second part of the pointer is contained in the sub-authority values 514 |

Notably, in some scenarios, the customer number or pointer 518 includes 4, 8, 12 or 16 bytes of information. The customer number specifies (a) the business entity to which a respective user is an employee and/or (b) a network device which is owned by the business entity and to which the user is assigned. The pointer points to a memory location at which certain information is stored. Since the customer number or pointer is added to the sub-authority values, the sub-authority count 504 is modified to include a count for each four (4) bytes of the sub-authority value that is used for the customer number or pointer.

A pointer is employed (as opposed to a customer number) when the external device (e.g., computing device 106 of FIG. 1) is unable to provide a SID to the SID based server (e.g., server 110 of FIG. 1) since it employs an alternative authentication schemes (e.g., an SAML authentication scheme or a mixture of both SID and SAML-based authentication scheme). The pointer specifies a location in a datastore (e.g., a local memory of the server 110) where the non-SID token is stored for later use.

Notably, no changes are needed within the core SID based system (e.g., server 110 of FIG. 1) since the composite SID 500 retains its characteristics as a unique opaque identifier for the original customer-specific AD object or authentication token. Thus, the SID-encoded identity can be passed through the SID based system, stored, and used in equality checks and simple diagnostics without change to existing SID based code. The composite SID 500 only needs to be decomposed into its encoded elements were knowledge of the underlying identity is required.

Where the original SID leaves insufficient bytes free to allow a customer identifier to be added or where the underlying identity is an authentication scheme token (e.g., SAML token), the SID format byte 512 indicates that the composite SID 500 is used as key into an external index containing (a) the original customer identifier and SID or (b) underlying authentication token.

Where the underlying identity is an SAML or alternative authentication token, the composite SID 500 can comprise a small fixed marker SID (with an appropriate format byte) merged with a token identifier that uniquely identifies the underlying token. In this case, the SID may comprise a Globally Unique Identifier ("GUID") or other type of identifier. Because the marker SID has no specific significance, the token identifier can be larger than a GUID if required, or further information about the underlying token can be encoded into the resulting composite SID without risk of overflowing the sixty-eight (68) byte SID size limit. Alternatively, if an external authentication token is sufficiently small, possibly after compression, it may also be possible to encode the entire token into the composite SID (using a different format byte) thus avoiding the cost of the external index lookup.

Referring now to FIG. 7, there is provided a flow diagram of an illustrative method 700 for operating a computing system using composite SIDs. Notably, the point of the composite SIDs is that they can be stored and manipulated using standard Windows SID data types. Thus, they can (for example) be stored, compared, passed around the system, and printed using the same code used for a standard SID without any code changes. The composite SIDs act as opaque identifiers for the original trustee.

Method 700 begins with 702 and continues with 704 where an original SID (e.g., SID 300 of FIG. 3) is communicated from a first computing device (e.g., computing device 102 or 104 of FIG. 1) to an SID based sever (e.g., SID based server 110 of FIG. 1). The original SID is received at the SID based sever, as shown by 706. Next in 708, the original SID is transformed or converted into a first composite SID (e.g., composite SID 500 of FIG. 5). This transformation or conversion is achieved by: modifying an identifier authority value (e.g., identifier authority value 306 of FIG. 3) of the original SID to include an SID format value (e.g., SID format value 512 of FIG. 5) so as to form a composite field value (e.g., composite field value 506 of FIG. 5); modifying a sub-authority values portion (e.g., sub-authority values 308 of FIG. 3) of the original SID to include all or some of a customer number (e.g., customer number 518 of FIG. 5); optionally modifying the identifier authority value (e.g., identifier authority value 306 of FIG. 3) of the original SID to include some of the customer number (e.g., customer number portion 520 of FIG. 5); and/or (4) modifying a sub-authority count (e.g., sub-authority count 304 of FIG. 3) of the original SID to include a count for the customer number. The first composite SID is the used internally by the SID based server for a variety of functions, as shown by 710.

During operations, the SID based server determines whether it needs to communicate with an external device (e.g., computing device 102 or 104 of FIG. 1). If it does not

[712:NO], then method 700 returns to 710. In contrast, if the SID based server does need to communicate with the external device [712:YES], then 714 is performed where the first composite SID is transformed or converted back into the original SID. This transformation or conversion involves: extracting an SID format value (e.g., SID format value 512 of FIG. 5) from a composite field value (e.g., composite field value 506 of FIG. 5) of the first composite SID; extracting a customer number from an identifier authority value (e.g., identifier authority value 510 of FIG. 5) and/or sub-authority values (e.g., sub-authority values 514 of FIG. 5) of the first composite SID; and/or modifying the sub-authority count (e.g., sub-authority count 504 of FIG. 5) to remove the count(s) added for the customer number. The original SID is then communicated from the SID based server to the external device (e.g., the first computing device), as shown by 716.

Figure 7A:
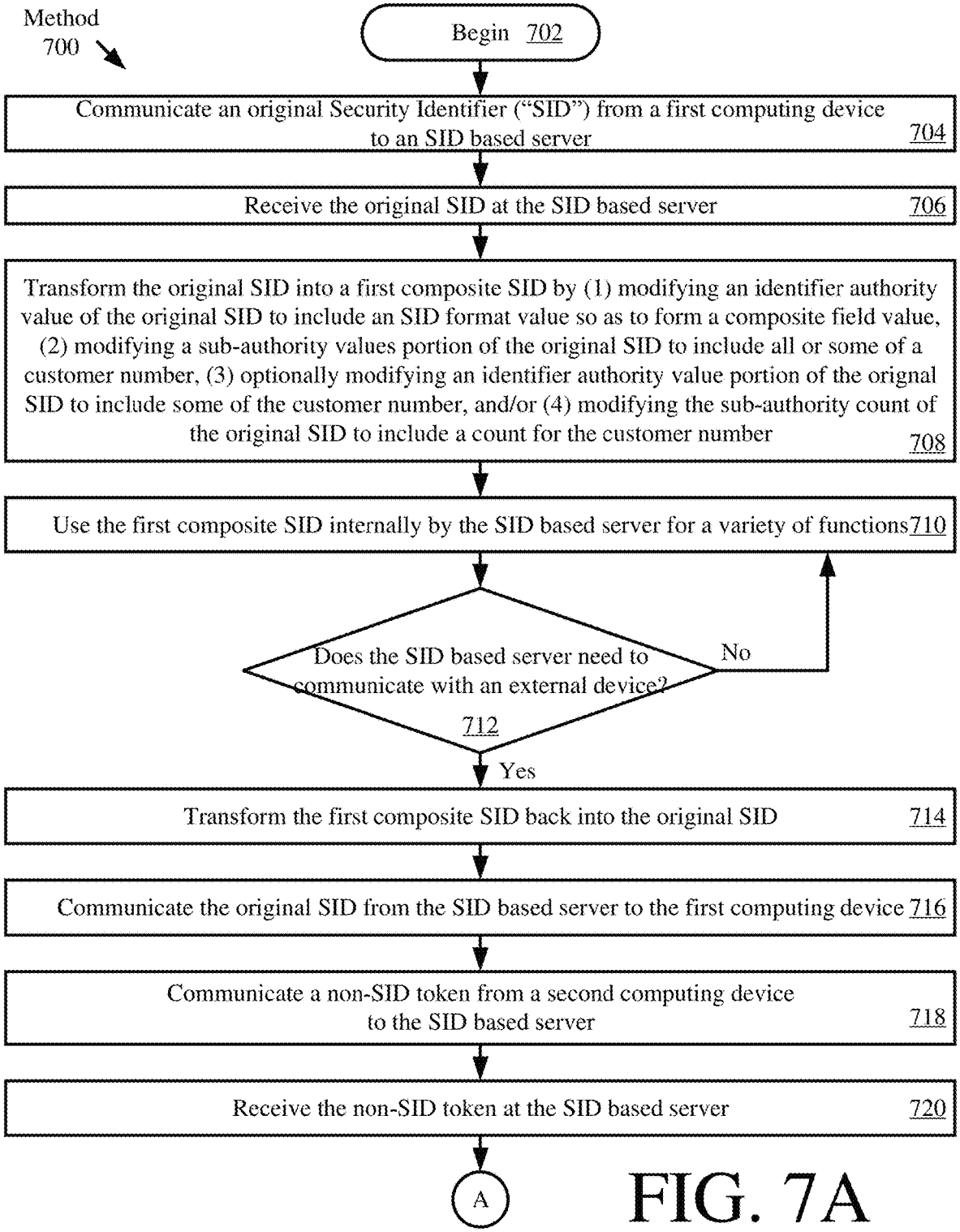
FIGS. 7A-7B (collectively referred to as "FIG. 7") is a flow diagram of an illustrative method for generating composite SIDs.
Figure 7B:
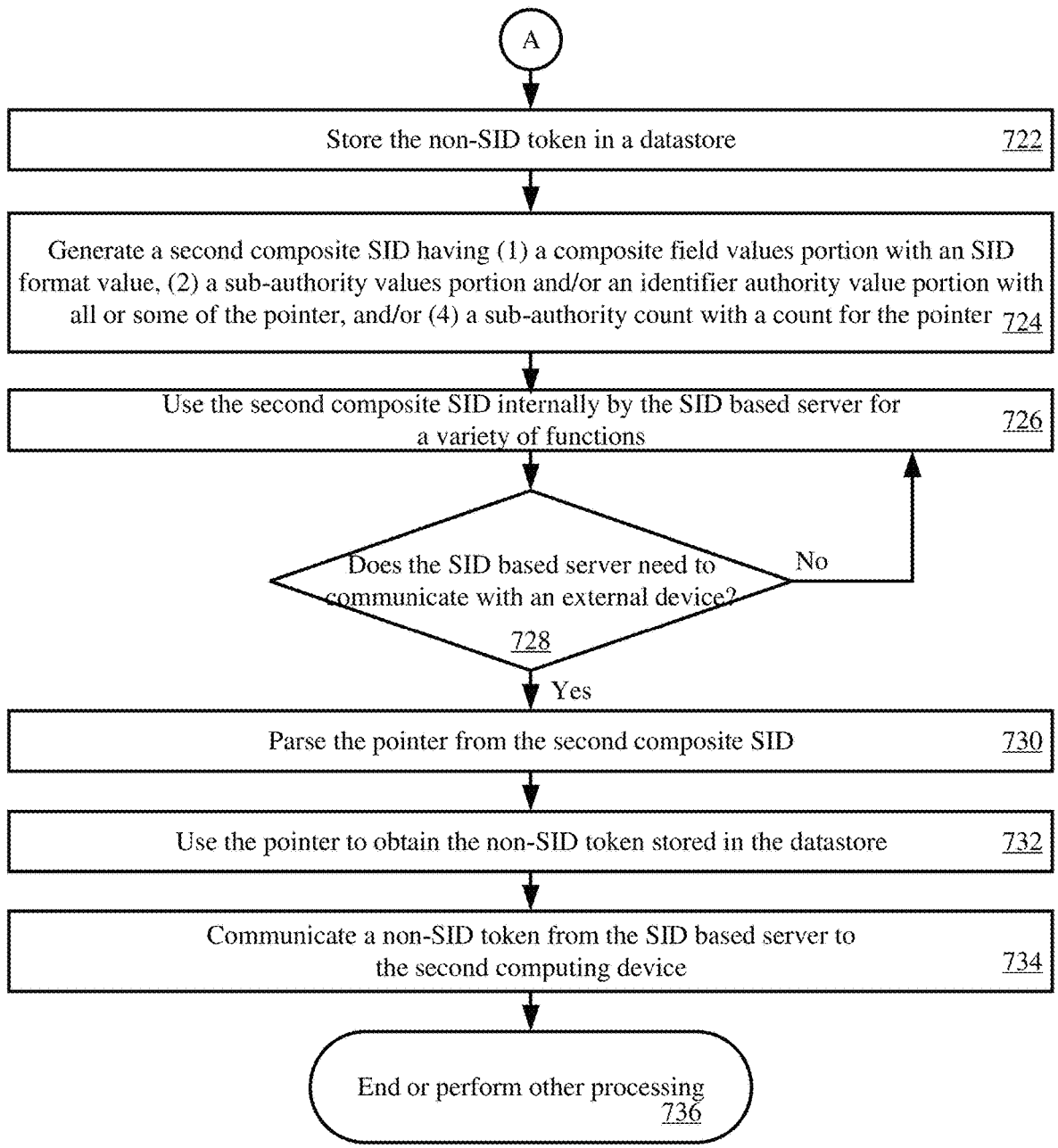

As noted above, the present solution is also applicable in non-SID token based scenarios. 718-734 of FIGS. 7A-7B describe an illustrative method in such scenarios. Notably, 718-734 can be performed prior to 704-716, concurrent with 704-716, or subsequent to 704-716.

As shown in FIG. 7A, 718 involves communicating a non-SID token (e.g., SAML token of FIG. 1) from a second computing device (e.g., computing device 106 of FIG. 1) to the SID based server. In 720, the non-SID token is received at the SID based server. Thereafter, method 700 continues with 722 of FIG. 7B.

As shown in 722 of FIG. 7B, the SID based server stores the non-SID token in a datastore (e.g., an internal memory of the SID based server or an external database communicatively coupled to the SID based server). Next in 724, the SID based server generates a second composite SID having: a composite field value (e.g., composite field value 506 of FIG. 5); sub-authority values (e.g., sub-authority values 514 of FIG. 5) and/or an identifier authority value (e.g., identifier authority value 510 of FIG. 5) with all or some of a pointer (e.g., pointer 518, 520 of FIG. 5); and/or a sub-authority count with a count for the pointer. The pointer is a value that refers to another value (e.g., the SMAL token) previously stored in the datastore (e.g., such as in 722). The second composite SID is then used by the SID based server in 726 for a variety of functions.

During operations, the SID based server determines whether it needs to communicate with an external device (e.g., computing device 106 of FIG. 1). If it does not [728:NO], then method 700 returns to 726. In contrast, if the SID based server does need to communicate with the external device [728:YES], then 730 is performed where the pointer is parsed from the second composite SID. The parsed pointer is then used in 732 to obtain the non-SID token previously stored in the datastore during 722. The non-SID token is then used in 734 to communicate information from the SID based server to the second computing device. Subsequently, 736 is performed where method 700 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a computing system, comprising:
    receiving, by a computing device, a Security Identifier ("SID"), the SID comprising an array of bytes that represent a plurality of values, at least one of the plurality of values comprising an identifier authority value represented by a subset of the array of bytes;
    modifying, by the computing device, the received SID to generate a composite SID by assignment of a portion of the subset of the array of bytes that represent the identifier authority value to represent an SID format value, without modification of the identifier authority value, to form a composite field within the array of bytes, wherein the composite SID is configured to uniquely identify an external device and to permit the external device to access at least one resource hosted on the computing device;
    converting, by the computing device, the composite SID back into the received SID by extracting the SID format value from the composite field in response to a determination that the computing device is to communicate with the external device; and
    providing, by the computing device, data to the external device that includes the converted SID to facilitate communication between the computing device and the external device.

2. The method according to claim 1, wherein a length of the subset of the array of bytes is equal to the length of the composite array.

3. The method according to claim 1, wherein the SID format value is selected to have a non-zero value when an indication is to be made that an SID has a composite SID format.

4. The method according to claim 3, wherein the SID format value is selected to have a zero value when an indication is to be made that an SID has a non-composite SID format.

5. The method according to claim 1, wherein modifying, by the computing device, the received SID to generate the composite SID further comprises adding a pointer to specify a memory location at which non-SID authentication information or a customer number is stored.

6. The method according to claim 5, wherein the pointer or customer number is at least partially contained in an SID sub-authority values and at least partially contained in the SID identifier authority value.

7. The method according to claim 5, wherein modifying, by the computing device, the received SID to generate the composite SID further comprises modifying a sub-authority count to include at least one count for the pointer or customer number.

8. The method according to claim 5, wherein the non-SID authentication information comprise a Security Assertion Markup Language ("SAML") token.

9. The method according to claim 1, wherein the SID is (a) received by the computing device from a remote computing device or (b) received by the computing device in response to a reception of a non-SID token.

10. The method according to claim 1, further comprising, performing, by the computing device, at least one internal function of the computing device with use of the composite SID.

11. A system, comprising:
a processor; and
a non-transitory computer-readable storage medium comprising programming instructions that are configured to cause the processor to implement a method for inventory management, wherein the programming instructions comprise instructions to:
  receive a Security Identifier ("SID"), the SID comprising an array of bytes that represent a plurality of values, at least one of the plurality of values comprising an identifier authority value represented by a subset of the array of bytes;
  modify the received SID to generate a composite SID by assignment of a portion of the subset of the array of bytes that represent the identifier authority value to represent an SID format value, without modification of the identifier authority value, to form a composite field within the array of bytes, wherein the composite SID is configured to uniquely identify an external device and to permit the external device to access at least one resource hosted on the computing device;
  convert the composite SID back into the received SID by extracting the SID format value from the composite field in response to a determination that the computing device is to communicate with the external device; and
  provide data to the external device that includes the converted SID to facilitate communication with the external device.

12. The system according to claim 11, wherein a length of the subset of the array of bytes is equal to the length of the composite array.

13. The system according to claim 11, wherein the SID format value is selected to have a non-zero value when an indication is to be made that an SID has a composite SID format.

14. The system according to claim 13, wherein the SID format value is selected to have a zero value when an indication is to be made that an SID has a non-composite SID format.

15. The system according to claim 11, wherein the programming instructions to modify the received SID to generate the composite SID further comprise instructions to add a pointer specifying a memory location at which non-SID authentication information is stored or a customer number indicating an entity to which a user is associated.

16. The system according to claim 15, wherein the pointer or customer number is at least partially contained in an SID sub-authority values and at least partially contained in the SID identifier authority value.

17. The system according to claim 15, wherein the programming instructions further comprise instructions to modify a sub-authority count of the original SID to include at least one count for the pointer or customer number.

18. The system according to claim 15, wherein the non-SID authentication information comprise a Security Assertion Markup Language ("SAML") token.

19. The system according to claim 11, wherein the programming instructions further comprise instructions to receive the SID sent from a remote computing device or receive the SID in response to a reception of a non-SID token.

20. The system according to claim 11, wherein the programming instructions further comprise instructions to, perform at least one internal function with use of the composite SID.

\* \* \* \* \*